(12) United States Patent
Eggermont et al.

(10) Patent No.: US 11,985,219 B2
(45) Date of Patent: May 14, 2024

(54) DIGITAL COMMUNICATIONS BUS SUITABLE FOR AUTOMOTIVE APPLICATIONS

(71) Applicant: SEMICONDUCTOR COMPONENTS INDUSTRIES, LLC, Phoenix, AZ (US)

(72) Inventors: Jean-Paul Anna Joseph Eggermont, Pellaines (BE); Johannes Vorenholt, Leek (NL); Peter Hus, Spišská Nová Ves (SK)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 85 days.

(21) Appl. No.: 17/811,009

(22) Filed: Jul. 6, 2022

(65) Prior Publication Data
US 2024/0014998 A1    Jan. 11, 2024

(51) Int. Cl.
*H03D 3/24* (2006.01)
*H04L 7/00* (2006.01)
*H04L 12/40* (2006.01)

(52) U.S. Cl.
CPC .. *H04L 7/0016* (2013.01); *H04L 2012/40215* (2013.01); *H04L 2012/40273* (2013.01)

(58) Field of Classification Search
CPC ......... H04L 7/0016; H04L 2012/40215; H04L 2012/40273; G06F 11/0754

USPC .......................................... 375/373–376, 356
See application file for complete search history.

(56) References Cited

U.S. PATENT DOCUMENTS

| | | | |
|---|---|---|---|
| 10,079,650 B2 | 9/2018 | Aichriedler | |
| 10,721,007 B2 | 7/2020 | Aichriedler | |
| 11,018,788 B2 | 5/2021 | Airchriedler | |
| 2015/0301968 A1* | 10/2015 | Kessler | G06F 11/0754 710/110 |
| 2019/0344663 A1 | 11/2019 | Ricci | |
| 2020/0273268 A1 | 8/2020 | Bhattacharyya et al. | |
| 2021/0242954 A1 | 8/2021 | Aichriedler | |

OTHER PUBLICATIONS

"CAN FD", Wikipedia, retrieved from "https://en.wikipedia.org/w/index.php?title=CAN_FD&oldid=1081988464," on Apr. 10, 2022, 5 pages.

* cited by examiner

*Primary Examiner* — Phuong Phu
(74) *Attorney, Agent, or Firm* — Ramey LLP

(57) ABSTRACT

Provided herein is a digital communications bus suitable for automotive applications, along with bus controllers and sensors that use the bus and its associated communication methods. One illustrative sensor includes: a clock signal generator; a bus interface coupled to differential signal conductors to detect periodic synchronization pulses from a bus controller; and a controller that aligns a clock signal from the clock signal generator with the periodic synchronization pulses. The bus interface sends digital data between the periodic synchronization pulses to the bus controller using the clock signal to control symbol transitions.

20 Claims, 3 Drawing Sheets

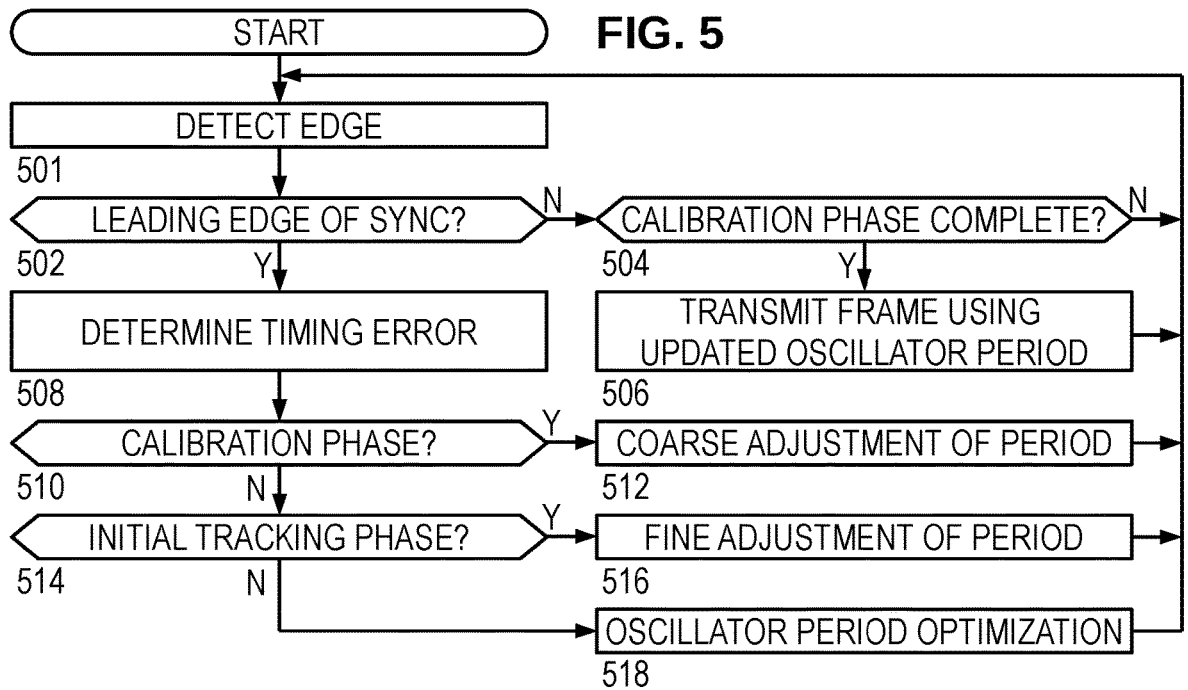

DIGITAL COMMUNICATIONS BUS SUITABLE FOR AUTOMOTIVE APPLICATIONS

BACKGROUND

Modern automobiles are equipped with an impressive number and variety of sensors. For example, cars are typically equipped with a motor position sensor to monitor engine speed, to estimate fuel consumption, and to provide engine diagnostics. Traditionally such "high speed" sensors employ a resolver with an analog interface for in phase and quadrature phase output signals. To provide protection against electromagnetic interference and emissions, each of the output signals is typically conveyed as differential signals over a twisted wire pair, using relatively costly filters to maintain electromagnetic compatibility. While a digital interface for such sensors potentially offers more robust operation with reduced implementation cost, the existing digital buses suitable for automotive environments cannot support the necessary data rates.

SUMMARY

Accordingly, there are disclosed herein a digital communications bus suitable for automotive applications, along with bus controllers and sensors that use the bus and its associated communication methods. One illustrative sensor includes: a clock signal generator; a bus interface coupled to differential signal conductors to detect periodic synchronization pulses from a bus controller; and a controller that aligns a clock signal from the clock signal generator with the periodic synchronization pulses. The bus interface sends digital data between the periodic synchronization pulses to the bus controller using the clock signal to control symbol transitions.

An illustrative controller-area network includes: a bus controller coupled to a pair of differential signal conductors to transmit periodic synchronization pulses; a sensor coupled to the pair of differential signal conductors to receive the periodic synchronization pulses, the sensor having a controller that aligns a clock signal with the periodic synchronization pulses; and a bus interface that sends digital data between the periodic synchronization pulses to the bus controller using the clock signal to control symbol transitions.

An illustrative digital communication method includes: generating a local clock signal; aligning the local clock signal with periodic synchronization pulses from a bus controller; and sending digital data between the periodic synchronization pulses to the bus controller and using the clock signal to control symbol transitions.

Each of the foregoing embodiments may be employed individually or conjointly, and they may further employ one or more of the following optional features in any suitable combination: 1. as part of said aligning, the controller adjusts a period of the clock signal to match 1/N of a period of the synchronization pulses, N being an integer. 2. the controller uses leading edges of the synchronization pulses to determine the period of the clock signal. 3. the controller uses trailing edges of the synchronization pulses to set a phase of the clock signal. 4. as part of said aligning, the controller performs a coarse calibration phase before the bus interface begins sending digital data. 5. as part of said aligning, the controller performs an adaptive tracking phase after the bus interface begins sending digital data. 6. transducer electronics that collect measurements independently of said clock signal, the controller using the clock signal to capture said measurements and derive the digital data therefrom. 7. the controller uses the clock signal to capture independently-acquired measurements from which the digital data is derived. 8. the captured measurements include timestamp information.

BRIEF DESCRIPTION OF THE DRAWINGS

FIG. 5 is a flow diagram of an illustrative data communication method.

DETAILED DESCRIPTION

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

Figure 1:
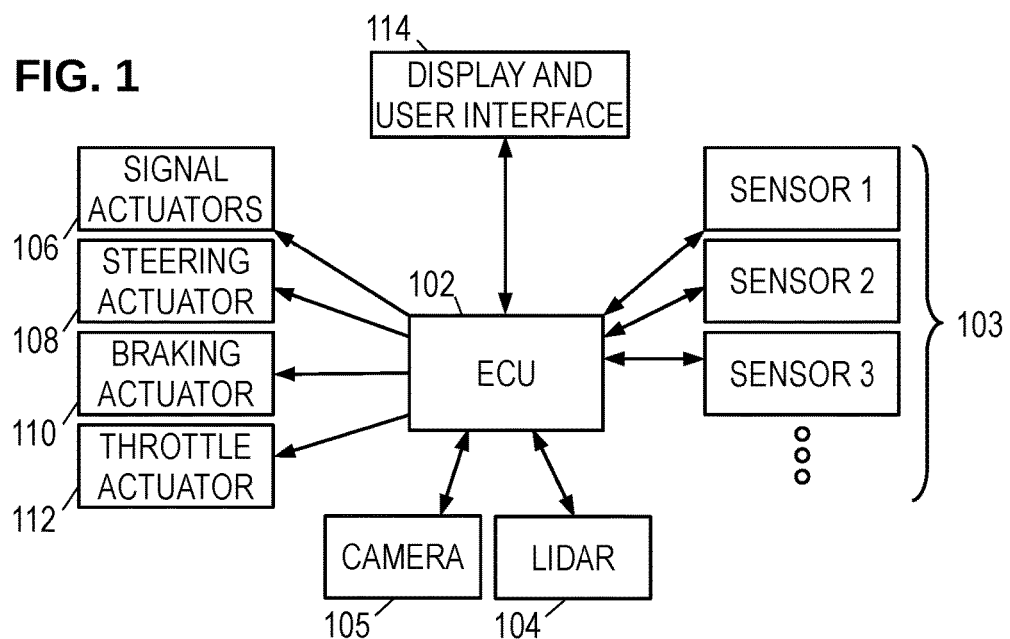
FIG. 1 is a block diagram of an illustrative controller area network.

FIG. 1 shows an illustrative controller area network (CAN) such as might be found in an automotive context. An electronic control unit (ECU) 102 is coupled to various sensors 103 including a LIDAR (light detection and ranging) unit 104, and a camera 105, via point-to-point links forming a star topology. Other bus topologies, such as tree, ring, and daisy chain, may also be suitable. To provide automated driver assistance, the ECU 102 may further connect to a set of actuators such as a turn-signal actuator 106, a steering actuator 108, a braking actuator 110, and throttle actuator 112. ECU 102 may further coupled to an interactive interface 114 to accept user input and provide a display of the various measurements and system status. Using the interface, sensors, and actuators, ECU 102 may provide automated parking, assisted parking, lane-change assistance, obstacle and blind-spot detection, and other desirable features.

Figure 2:
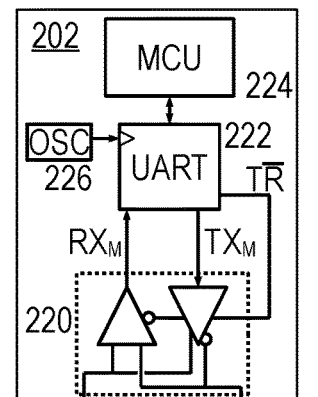
FIG. 2. is a circuit schematic of an illustrative digital communications bus.
Figure 2:
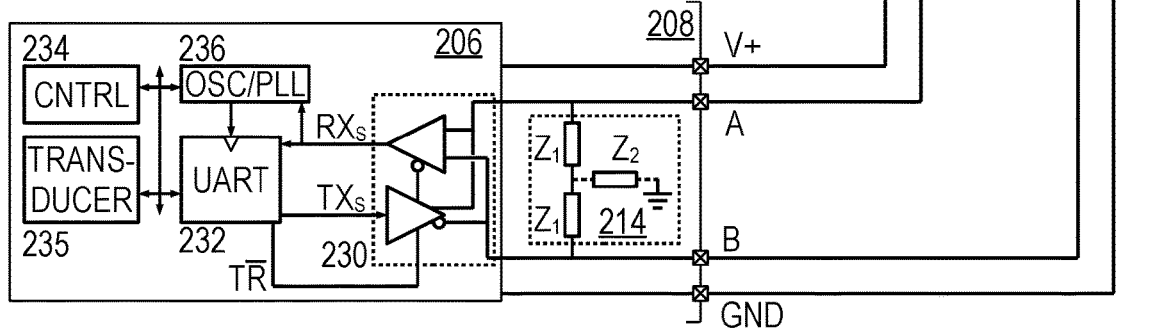

FIG. 2 is a schematic of an illustrative data bus having a bus controller 202 (such as ECU 102) on a first printed circuit board 204 coupled to a sensor 206 on a second printed circuit board 208. The first PCB 204 includes a low drop out (LDO) voltage regulator 210 and a ground connection to supply power to the second PCB 208 via respective conductors V+, GND. A pair of differential signal conductors A,B transports a downlink signal from the bus controller 202 to the sensor 206 and an uplink signal from the sensor to the bus controller.

The PCBs may include termination circuits 212, 214 to provide impedance matching and/or electromagnetic compatibility by attenuating higher frequencies. The termination circuits are shown here as two equal impedances Z1 connected in series between conductors A and B, with an optional impedance Z2 coupled between the intermediate node and ground. The impedances Z1, Z2 can be chosen to provide the desired lowpass cutoff frequency.

The illustrated bus controller 202 includes a transceiver 220 for alternately sending a downlink signal $TX_M$ and receiving an uplink signal $RX_M$. A universal asynchronous receiver/transmitter (UART) module 222 formulates the downlink signal to carry commands and data from microcontroller unit (MCU) 224, and decodes the uplink signal to provide responses and measurements from sensor 206 to the MCU 224. Optionally (e.g., for RS485-type transceivers), the UART module 222 provides a T/R signal to the transceiver 220 to toggle between transmit and receive modes. CAN-compliant transceivers do not require a signal to transition between transmit and receive modes. An oscillator 226 provides a clock signal to the UART module 222. The UART's operations are performed in accordance with the clock signal, and hence the clock signal determines the timing of symbol transitions in the downlink signal.

The illustrated sensor 206 similarly includes a transceiver 230 for alternately receiving the downlink signal $RX_S$ and sending the uplink signal $TX_S$, optionally operating in response to a T/R signal from a UART module 232. A controller 234 receives the downlink commands and parameters that configure the sensor's operation, and provides measurements from transducer circuitry 235 for the UART 232 to convert into upload messages. An oscillator 236 provides a clock signal for use by the UART 232. As described further below, the clock signal generated by oscillator 236 may be aligned with periodic synchronization pulses from the bus controller 202, enabling the UART 232 to generate uplink messages with symbols synchronized to the clock signal generated by oscillator 226.

Figure 3:
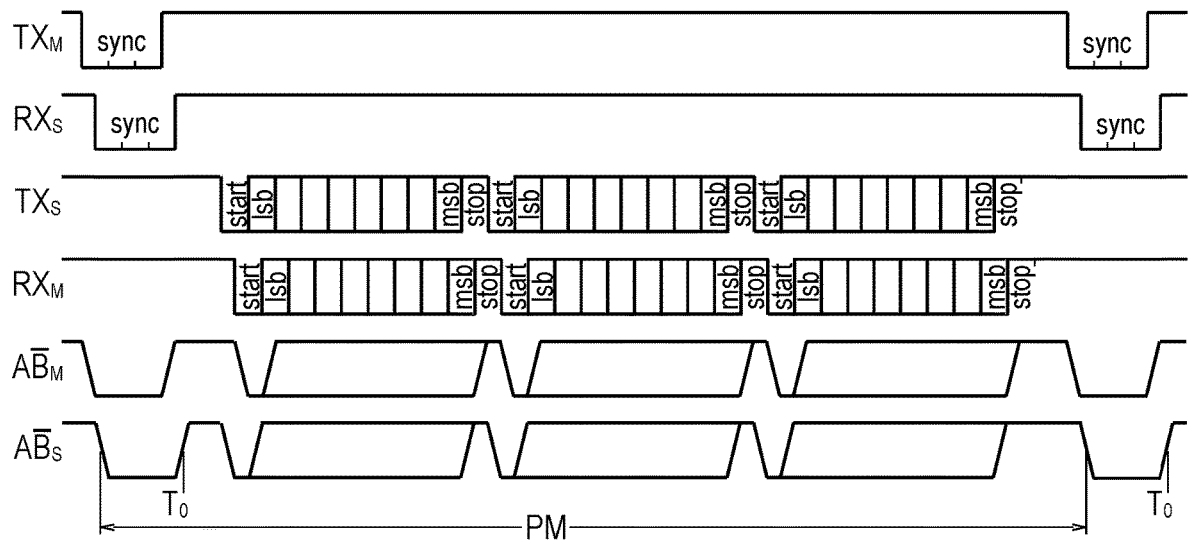
FIG. 3 is a timing graph showing various illustrative signal waveforms in the system.

FIG. 3 shows an illustrative timing relationship between the various signal waveforms that may be present on the digital communications bus. Once configuration of the sensor is complete, the bus controller sends periodic synchronization pulses as shown in waveform $TX_M$. The illustrated pulses are three bit intervals wide, but this is not a requirement. Waveform $RX_S$ shows the synchronization pulses with a slight delay due to propagation time through the conductors and interface electronics.

The sensor responds with an uplink waveform $TX_S$, shown here as a template for three UART-standard bytes each having a single start bit preceding the least significant bit and a stop bit following the most significant bit. Additional stop bits may be preferred in some systems, and in other systems it may be preferred to skip the stop bits. Other message formats would also be suitable, e.g., a greater or lesser number of bytes, different bit ordering, and/or different word lengths between start and stop bits. Waveform $RX_M$ shows the uplink waveform with a delay to represent the propagation time from the sensor to the bus controller.

The last two curves of FIG. 3 show the differential voltage between the signal conductors A, B at the master and sensor sides, respectively. (The effects of propagation delay are exaggerated for illustrative purposes.) The sensor may use the interval between leading edges of the synchronization pulses as the synchronization period measurement (PM) from which the bit period (or more generally, "symbol period") is derived, and may use the trailing edges of the synchronization pulses as the zero-phase alignment for the transmit symbol clock.

Figure 4:
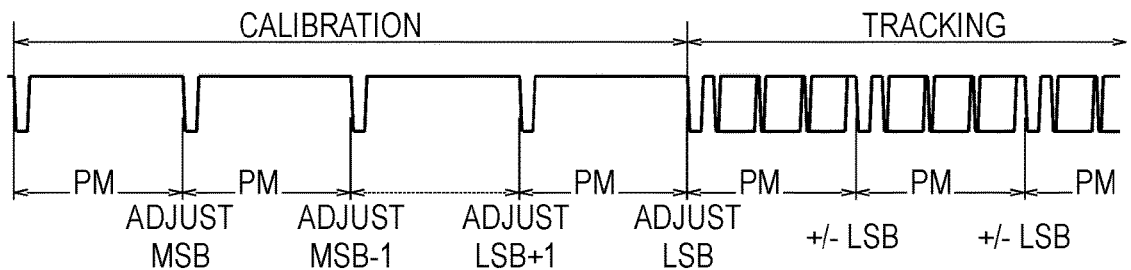
FIG. 4 is a graph of clock synchronization phases.

The synchronization and alignment process may be performed across multiple synchronization pulse cycles as shown in FIG. 4. An initial calibration period begins after power-on or when the sensor is reset. After detecting the synchronization pulses, the sensor begins acquiring period measurements between the leading edges of the pulses. In one contemplated embodiment, the sensor uses a local voltage controlled oscillator coupled to a counter or "frequency divider". The control voltage is set to a default mid-range value and the most significant bit of an adjustment value is set. If the next synchronization pulse arrives before the counter elapses, the control voltage is increased by the adjustment value to increase the local oscillator frequency. Conversely, if the counter elapses before the next synchronization pulse arrives, the control voltage is decreased by the adjustment value to offset value to decrease the local oscillator frequency. The adjustment value is then cut in half, so that only its second-most significant bit is asserted. The process is repeated until only the least significant bit of the adjustment value is asserted.

Once the smallest adjustment value is reached and applied, the sensor may transition from calibration mode to tracking mode. During the tracking mode, the sensor sends measurement data in response to each synchronization pulse, but monitors the period between synchronization pulses and adds or subtracts the minimum adjustment value from the control voltage after each period measurement. In some implementations, the sensor may detect when the adjustments regularly alternate in sign and may apply an error filter or may otherwise increase the number of synchronization pulses used for each adaptation of the control voltage.

FIG. 5 is a flow diagram of an illustrative data communication method that may be implemented by a sensor device. In block 501, the sensor monitors the conductors for a pulse edge in the differential signal. The sensor tests in block 502 whether the edge is the leading edge of a synchronization pulse, and if not, determines whether the calibration phase is complete in block 504. If calibration is ongoing, control returns to block 501. Otherwise, in block 506, the sensor uses the edge to initiate transmission of a data frame to the bus controller. It is expected that the measurement data being transmitted will be acquired independently of the synchronization signals, and hence implementations requiring increased precision may transmit measurement timestamps with the measurement data. After the data frame is complete, control returns to block 501.

If in block 502, the sensor determines the edge is the leading edge, the sensor determines in block 508 whether the local oscillator frequency is too high or too low. In block 510, the sensor determines whether the calibration phase is ongoing, and if so, uses the timing error to adjust the oscillator frequency in block 512 using the coarse adjustment value. As previously described, the coarse adjustment value reduces with each cycle until the calibration phase is complete.

If in block 510, the calibration phase is determined to be complete, the sensor checks in block 514 whether an initial tracking phase is complete. During the initial tracking phase, the sensor performs only least significant bit (LSB) adjustments of the oscillator control voltage to provide fine adjustment of the oscillator period in block 516. Once the local oscillator frequency/period converges, the sensor may provide adaptive optimization using timing error measurements from multiple synchronization pulse cycles in block 518.

Though the operations shown and described in FIG. 5 are treated as being sequential for explanatory purposes, in practice the method may be carried out by multiple integrated circuit components operating concurrently. The sequential discussion is not meant to be limiting.

The clock synchronization achieved between the sensor and bus controller is expected to enable much higher data transfer rates including rates above about 8 Mbps on buses that otherwise conform to the CAN-FD automotive bus standard. In contrast with other bus types, such as buses where a bus controller employs a question & answer protocol to selectively retrieve data from multiple addressable sensor devices, the disclosed synchronized interface clock configuration enables a sensor using a minimal yet robust signaling protocol to continuously supply measurement information to the controller without limiting the manner in which the sensor acquires the measurement information.

What is claimed is:

1. A sensor that comprises:
    a clock signal generator;
    a bus interface coupled to differential signal conductors and configured to detect periodic synchronization pulses from a bus controller, each pulse of the periodic synchronization pulses initiating an interval for transmission of a data frame to the bus controller without further data transmission from the bus controller; and
    a controller configured to align a clock signal from the clock signal generator with the periodic synchronization pulses,
    the bus interface configured to send the data frames between the periodic synchronization pulses to the bus controller and to use the clock signal to control symbol transitions.

2. The sensor of claim 1, wherein as part of said aligning, the controller is configured to adjust a period of the clock signal to match 1/N of a period of the synchronization pulses, N being an integer.

3. The sensor of claim 1, wherein the controller is configured to use only leading edges of the synchronization pulses to determine a period of the clock signal.

4. The sensor of claim 3, wherein the controller is configured to use only trailing edges of the synchronization pulses to set a phase of the clock signal.

5. The sensor of claim 1, wherein as part of said aligning, the controller is configured to perform a coarse calibration phase before the bus interface begins sending the data frames.

6. The sensor of claim 5, wherein as part of said aligning, the controller is configured to perform an adaptive tracking phase after the bus interface begins sending the data frames.

7. The sensor of claim 1, further comprising transducer electronics configured to collect measurements independently of the clock signal, the controller being configured to use the clock signal to capture said measurements and derive the data frames therefrom.

8. A controller-area network that comprises:
    a bus controller coupled to a pair of differential signal conductors and configured to transmit periodic synchronization pulses, each of the periodic synchronization pulses initiating an interval for transmission of a data frame to the bus controller without further data transmission from the bus controller;
    a sensor coupled to the pair of differential signal conductors and configured to receive the periodic synchronization pulses, the sensor including:
        a controller configured to align a clock signal with the periodic synchronization pulses; and
        a bus interface configured to send the data frames between the periodic synchronization pulses to the bus controller and to use the clock signal to control symbol transitions.

9. The controller-area network of claim 8, wherein as part of said aligning, the controller is configured to adjust a period of the clock signal to match 1/N of a period of the synchronization pulses, N being an integer.

10. The controller-area network of claim 8, wherein the controller is configured to use only leading edges of the synchronization pulses to determine a period of the clock signal.

11. The controller-area network of claim 10, wherein the controller is configured to use only trailing edges of the synchronization pulses to set a phase of the clock signal.

12. The controller-area network of claim 8, wherein as part of said aligning, the controller is configured to perform a coarse calibration phase before the bus interface begins sending the data frames.

13. The controller-area network of claim 12, wherein as part of said aligning, the controller is configured to perform an adaptive tracking phase after the bus interface begins sending the data frames.

14. The controller-area network of claim 8, wherein the sensor further includes transducer electronics configured to collect measurements independently of the clock signal, the controller being configured to use the clock signal to capture said measurements and derive the data frames therefrom.

15. A digital communication method that comprises:
    generating a local clock signal;
    aligning the local clock signal with periodic synchronization pulses from a bus controller, each of the periodic synchronization pulses initiating an interval for transmission of a data frame to the bus controller without further data transmission from the bus controller; and
    sending the data frames between the periodic synchronization pulses to the bus controller and using the clock signal to control symbol transitions.

16. The method of claim 15, wherein said aligning includes deriving a period of the clock signal from only leading edges of the periodic synchronization pulses.

17. The method of claim 16, wherein said aligning further includes setting a phase of the clock signal based on only trailing edges of the periodic synchronization pulses.

18. The method of claim 15, further comprising: using the clock signal to capture independently-acquired measurements from which the data frames are derived.

19. The method of claim 18, wherein the captured measurements include timestamp information.

20. The method of claim 15, wherein said aligning includes performing a coarse calibration phase before sending the data frames and performing an adaptive tracking phase after a bus interface begins sending the data frames.

* * * * *